Aug. 27, 1940.                M. WALICKI                2,212,802
                            THREAD TOOL GAUGE
                            Filed Jan. 9, 1939
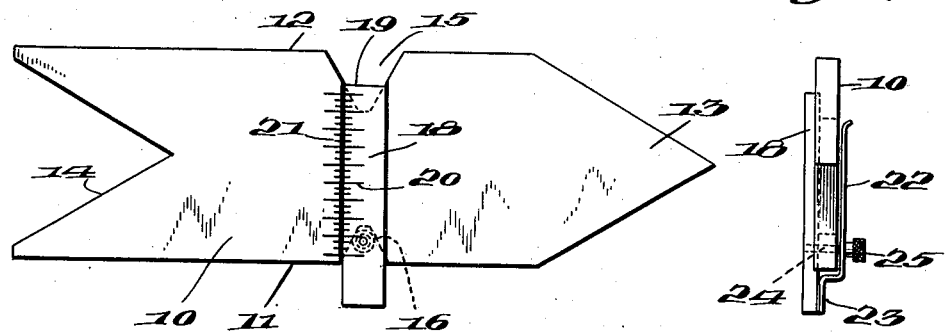
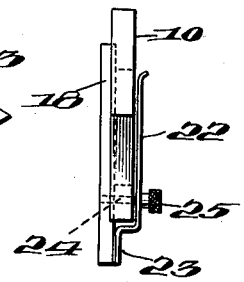
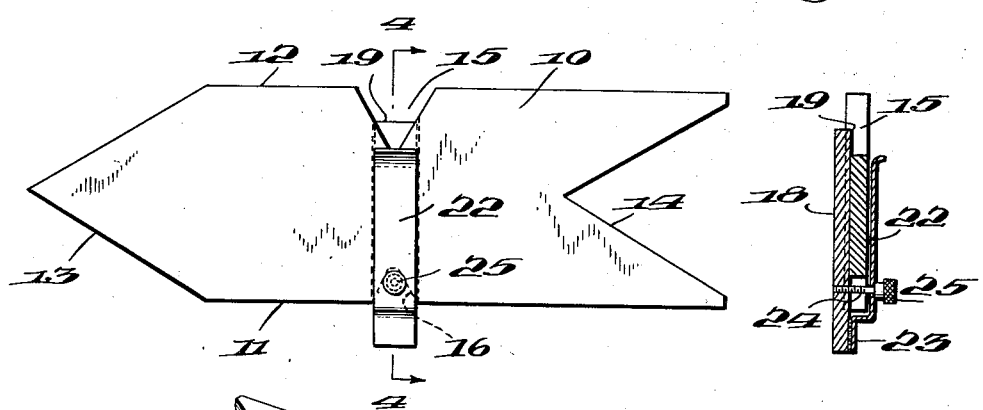
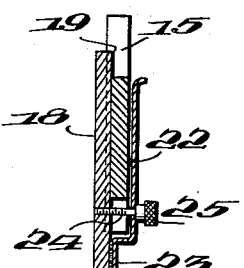
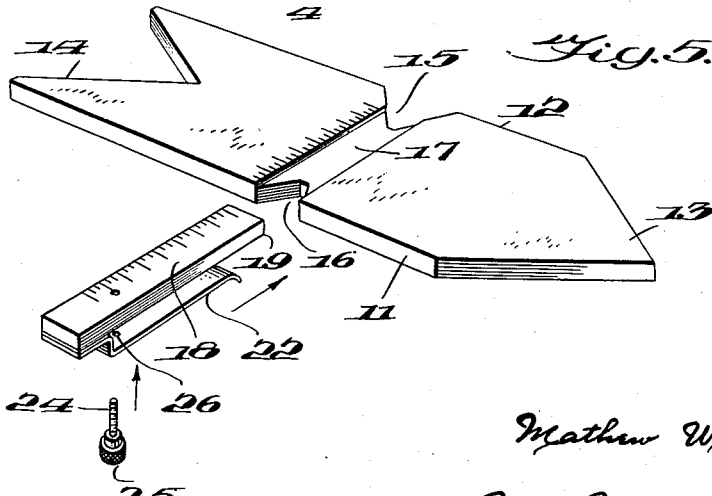
Inventor:
Mathew Walicki,
By Potter, Pierce + Scheffler,
Attorneys.

Patented Aug. 27, 1940

2,212,802

UNITED STATES PATENT OFFICE 2,212,802

THREAD TOOL GAUGE

Mathew Walicki, Chicago, Ill.

Application January 9, 1939, Serial No. 250,004

2 Claims. (Cl. 33—185)

The present invention relates to machinists' gauges and particularly to gauges used in the grinding of thread cutting tools.

The primary object of the invention is to provide a gauge for thread cutting tools having means for measuring the angle of the side of the tool, in combination with means for indicating and marking on a thread cutting tool, before it is ground, the proper depth to which the tool is to be ground for the depth of thread to be cut.

Another object is to provide a gauge for thread cutting tools having a gauging notch for the reception of the end of a tool to be ground and gauge means providing a scribing edge adjustable in relation to said notch for marking on the tool the correct dimension of the flat for the pitch thread for which the tool is to be ground.

Other objects and advantages of the invention will be apparent from the following detailed description and upon reference to the accompanying drawing, wherein:

Fig. 1 is a top plan view of a preferred embodiment of the invention,

Fig. 2 is an end view taken from the righthand end of Fig. 1,

Fig. 3 is a bottom plan view,

Fig. 4 is a sectional view on the line 4—4 of Fig. 3,

Fig. 5 is a disjointed perspective view of the gauge parts, illustrating the manner of assembly.

Referring now more particularly to the details of construction of the gauge, 10 indicates the body of the gauge which is in the form of a flat metal plate of greater length than width. The gauge plate or body 10 has parallel side walls or edges 11 and 12 and is tapered to a point 13 at one end. The opposite end is provided with a V-notch 14.

Tool gauging notches 15 and 16 are formed in the sides of the body 10, one entering from each side, and are centered with respect to each other. The notch 15 has its walls disposed at 60° to each other for gauging a tool for cutting a U. S. standard thread having a pitch of 60°. The other notch may be of different pitch to increase the utility of the gauge.

The body of the gauge is provided on one face with a channel or groove 17 having straight parallel sides and extending laterally the entire width of the body of the gauge. The central axis of the channel 17 is the centerline of the notches 15 and 16.

A sliding gauge bar 18, formed to accurately fit the channel 17, is slidably disposed in the channel. The gauge bar 18 is of such a length as to extend to a position to overlie and partially cover the notch 15, or the notch 16 when inserted in the channel from the opposite end thereof. The end of the gauge bar 18 is formed as a straight scribing edge 19 extending at right angles to the centerline of the notches.

The face of the gauge bar 18 is provided with graduations 20 which cooperate with graduations 21 on the face of the body 10 adjacent the edge of the channel 17 in determining the proper setting of the gauge bar for scribing a tool to be ground.

The gauge bar is held in position in the channel 17 by a spring arm 22 secured to the underface of the bar 18 in spaced relation thereto by means of an offset end 23 which is welded or otherwise secured to the underface of the bar 18 at the end thereof opposite the scribing edge 19. A clamping set screw 24, having a knurled head 25, passes through an opening 26 in the spring arm 22 adjacent the offset end 23 and is threaded into the bar 18 for the purpose of drawing the spring arm into clamping engagement with the face of the gauge body 10 opposite the channel 17.

In the use of the gauge, the depth to which the point of the threading tool is to be ground off is determined by a depth gauge, or from standard tables and the sliding gauge bar 18 is inserted into the channel from the end opposite the notch to be employed in gauging the tool until its end 19 overlies the V-notch 15, for instance, the required amount. The set screw 24 is then tightened to clamp the gauge body between the spring arm 22 and the bar 18 so as to lock the bar against movement from the set position. The tool end is then inserted in the notch 15 and a scribing implement is run along the edge 19 to mark the line to which the point of the tool is to be ground off. In using the notch 16, the slide is withdrawn and inserted from the other end of the channel.

While a preferred embodiment of the invention has been shown and described by way of illustration, it will be understood that modification of the details of construction of the gauge may be resorted to without departing from the spirit of the invention, within the scope of the appended claims.

I claim:

1. In a gauge for thread cutting tools, a gauge plate having a tool gauging notch in one side thereof, a channel formed on one face of said plate extending across said face in alinement with said notch, and a gauge bar element slidably disposed in said channel having an end portion adapted to overlie a portion of said notch and having a scribing edge extending across said notch, a spring arm carried by said bar adapted to engage the face of said plate opposite said channel, and means for clamping said plate between said bar and spring arm to lock said bar in adjusted position.

2. In a gauge for thread cutting tools, a gauge plate having a tool gauging notch in one side thereof, a channel formed on one face of said plate extending across said face in alinement with said notch, and a gauge bar element slidably disposed in said channel having an end portion adapted to overlie a portion of said notch and having a scribing edge extending across said notch, and a spring arm carried by said bar adapted to engage the face of said plate opposite said channel.

MATHEW WALICKI.